T. WEBB.
Feed-Cutter.
No. 165,043. Patented June 29, 1875.
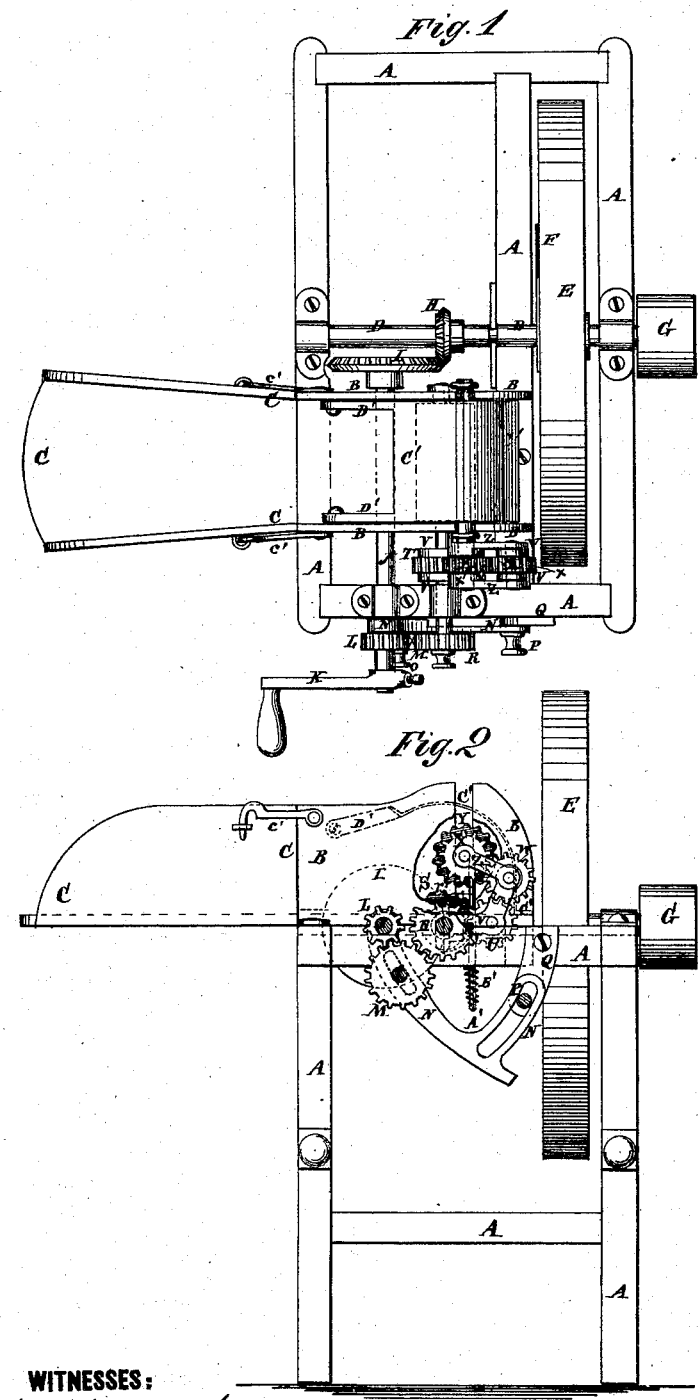
WITNESSES:
A. W. Almqvist
A. T. Terry
INVENTOR:
Thomas Webb
BY Munn
ATTORNEYS.
THE GRAPHIC CO.PHOTO-LITH.39 & 41 PARK PLACE, N.Y.

UNITED STATES PATENT OFFICE.

THOMAS WEBB, OF ELYRIA, OHIO.

IMPROVEMENT IN FEED-CUTTERS.

Specification forming part of Letters Patent No. 165,043, dated June 29, 1875; application filed January 18, 1875.

*To all whom it may concern:*

Be it known that I, THOMAS WEBB, of Elyria, in the county of Lorain and State of Ohio, have invented a new and useful Improvement in Feed-Cutter, of which the following is a specification:

Figure 1 is a top view of my improved machine. Fig. 2 is a side view of the same, partly in section, to show the construction.

Similar letters of reference indicate corresponding parts.

My invention has for its object to improve the construction of the feed-cutter for which Letters Patent No. 141,527 were granted to me August 5, 1873, so as to make it run steadier and with less friction, make it more compact and convenient, enable it to be readily adjusted to cut the feed finer or coarser, and to enable it to hold the material more firmly while being cut, and thus prevent any of the said material from being drawn out uncut.

The invention consists in the arrangement of the cutter-wheel within the frame of the machine, to give the driving-shaft a bearing upon both sides of said wheel; in the arrangement of the three gear-wheels that transmit motion from the crank-shaft to the feed-gearing upon the outside of the frame, to enable the said wheels to be conveniently shifted or changed; in the combination of the bent and slotted lever with the crank-shaft, the three gear-wheels that transmit motion from the crank-shaft to the feed-gearing, the bolt and hand-nut, and the supporting-arm; in the combination of the pivoted rigid arms with the curved or arched cover, and with the sides of the stationary part of the feed-box; and in the combination of the hook-rods and their coiled springs with the journals of the upper feed-roller and the sides of the stationary part of the feed-box, as hereinafter fully described.

A is the frame of the machine, to the top of which, near one end, is attached the stationary part B of the cutter or feed-box. The outer part C of the feed-box is detachable, rests upon the rear part of the top of the frame A, and is secured to the stationary part B of said feed-box by hooks $c'$, as shown in Figs. 1 and 2. D is the driving-shaft, which is placed parallel with the box B C, revolves in bearings attached to the middle part of the top of the frame A, and has a large wheel, E, attached to it, in such a position as to be close to the forward end or mouth of the feed-box B C. The wheel E is made heavy, so as to act as a balance or fly wheel, and to its spokes are bolted the knives F, the cutting-edges of which are made convex, and which are provided with set-screws to set their edges up to the mouth of the box as the said knives wear. The wheel E is arranged within the frame A, so that the shaft D may have bearings upon both sides of the said wheel, to cause it to run steadier and with less friction. To the projecting forward end of the shaft D is attached a pulley, G, to receive the band when the cutter is to be driven by power. To the middle part of the shaft D is attached a small bevel-gear wheel, H, the teeth of which mesh into the teeth of the larger bevel-gear wheel I, attached to the inner end of the shaft J. The shaft J revolves in bearings attached to the stationary part B of the feed-box, and to the end top bar of the frame A. To the projecting outer end of the shaft J is attached a crank, K, for operating the machine by hand. Upon the crank-shaft J, outside of the frame A, is placed a gear-wheel, L, the teeth of which mesh into the teeth of the gear-wheel M. The wheel L may be a cone gear-wheel, or a set of different-sized wheels may be used for giving a faster or slower feed, according as the material is desired to be cut coarser or finer. The wheel M runs upon a bushing secured to the slotted lever N by a bolt and hand-nut, O, so that the wheel M may be adjusted according as a larger or smaller gear-wheel, L, may be used upon the crank-shaft J. The rear end of the lever N rides upon and is thus pivoted to the crank-shaft J. The forward end of the lever N is bent upward, and is slotted to receive the bolt P, upon which it is secured by a hand-nut. The bolt P is attached to an arm, Q, secured to the frame A. When the machine is at work, the hand-nut P is screwed up with only sufficient force to hold the feed-gearing in gear, so that should any hard substance get into the feed-box and be fed forward, the lever N can be instantly thrown down to throw the feed-gearing out of gear, and thus prevent the machine from being broken. The teeth of the gear-wheel M mesh into the teeth of the gear-wheel R, attached detachably to the projecting end of the journal of the lower feed-roller S, the journals of which revolve in bearings attached to the stationary part B of the feed-box, and to the end top bar of the frame A. The three gear-wheels L M R are placed upon the outside of the frame A, so that the wheels L and R can be readily detached and replaced by larger or smaller ones, according as the material is to be cut finer or coarser. To the journal of the lower feed-roller S, within the frame A, is attached a gear-wheel, T, the teeth of which mesh into the teeth of the gear-wheel U. The gear-wheel U is pivoted to and between two angular bars, V, at their angles. The rear ends of the bars V ride upon and are pivoted to the journal of the lower feed-roller S, upon the opposite sides of the gear-wheel T. To and between the ends of the upper arms of the bars V is pivoted a gear-wheel, W, the teeth of which mesh into the teeth of the gear-wheel U, and also into the teeth of the gear-wheel X, attached to the journal of the upper feed-roller Y. The wheels W and X are held in gear with each other by two bars, Z, placed upon their opposite sides, and the lower ends of which are pivoted to the upper ends of the bars V, and their upper ends ride upon and are pivoted to the journal of the upper feed-roller Y. The journals of the upper feed-roller Y pass through and revolve in vertical slots in the sides of the stationary part B of the feed-box. By this construction the feed-rollers S Y will be revolved toward each other, so as to carry the material to be cut through between them, and at the same time the gear-wheels T U W X will be held in gear with each other, as the upper roller Y moves up and down to accommodate itself to the varying thickness of the material passing between the said rollers. A' are bars placed upon the opposite sides of the forward part B of the feed-box, and which have hooks formed upon their upper ends to hook upon the journals of the upper feed-roller Y. The bars A' pass down through lugs attached to the part B of the feed-box, and upon their lower parts are placed coiled springs B'. The lower ends of the coiled springs B' rest against nuts screwed upon the lower ends of the bars A', and their upper ends rest against the lugs through which the said bars A' pass. The hook-bars A' and the coiled springs B' thus hold the upper feed-roller Y down upon the material between the rollers Y S with sufficient force to carry it through between them. C' is a curved or arched cover, which passes over the upper feed-roller Y; and to the rear corners of which are rigidly attached arms D', which pass back along the inner sides of the sides of the stationary part B of the feed-box, and their rear ends are pivoted to said sides. The forward part of the cover C' curves downward to rest upon the bottom of the mouth of the feed-box, to hold the material while being cut, and prevent any of said material from being drawn out uncut.

If desired, the small bevel-gear wheel H, the bevel-gear wheel I, the shaft J, and its connecting gearing may be placed in front of the balance-wheel E, to enable a wider feed-box to be used with the same-sized balance-wheel.

Having thus described my invention, what I claim as new, and desire to secure by Letters Patent, is—

The double-slotted lever N, fulcrumed on shaft J, provided with pinion M, and adjustable on fixed plate Q, as and for the purpose set forth.

THOMAS WEBB.

Witnesses:
  JOHN GIBSON,
  BENJAMIN WEBB.